US008990089B2

(12) United States Patent
Wouters et al.

(10) Patent No.: US 8,990,089 B2
(45) Date of Patent: Mar. 24, 2015

(54) TEXT TO SPEECH SYNTHESIS FOR TEXTS WITH FOREIGN LANGUAGE INCLUSIONS

(71) Applicant: Nuance Communications, Inc., Burlington, MA (US)

(72) Inventors: Johan Wouters, Cham (CH); Christof Traber, Zürich (CH); David Hagstrand, Zürich (CH); Alexis Wilpert, Au (CH); Jürgen Keller, Güttingen (CH); Igor Nozhov, Zürich (CH)

(73) Assignee: Nuance Communications, Inc., Burlington, MA (US)

( * ) Notice: Subject to any disclaimer, the term of this patent is extended or adjusted under 35 U.S.C. 154(b) by 125 days.

(21) Appl. No.: 13/680,260

(22) Filed: Nov. 19, 2012

(65) Prior Publication Data

US 2013/0132069 A1    May 23, 2013

(30) Foreign Application Priority Data

Nov. 17, 2011    (EP) .................................... 11189474

(51) Int. Cl.
*G10L 13/08*    (2013.01)
*G06F 17/28*    (2006.01)
*G10L 13/06*    (2013.01)

(52) U.S. Cl.
CPC .............. *G06F 17/28* (2013.01); *G10L 13/086* (2013.01); *G10L 13/06* (2013.01)
USPC ................................ 704/260; 704/8; 704/258

(58) Field of Classification Search
CPC ..... G06F 17/289; G10L 13/08; G10L 13/043; G10L 15/005
USPC ...................... 704/8, 258, 260, 269
See application file for complete search history.

(56) References Cited

U.S. PATENT DOCUMENTS 8,180,626 B2 *   5/2012   Georgiev et al. ................... 704/8
8,583,418 B2 * 11/2013   Silverman et al. ................ 704/9

(Continued)

FOREIGN PATENT DOCUMENTS

EP    1892700 A1    2/2008

OTHER PUBLICATIONS

European Patent Office, European Search Report; European Application No. EP 11 18 9474 dated May 25, 2012, 7 pages.

(Continued)

*Primary Examiner* — Douglas Godbold
(74) *Attorney, Agent, or Firm* — Daly, Crowley, Mofford & Durkee, LLP

(57) ABSTRACT

A speech output is generated from a text input written in a first language and containing inclusions in a second language. Words in the native language are pronounced with a native pronunciation and words in the foreign language are pronounced with a proficient foreign pronunciation. Language dependent phoneme symbols generated for words of the second language are replaced with language dependent phoneme symbols of the first language, where said replacing includes the steps of assigning to each language dependent phoneme symbol of the second language a language independent target phoneme symbol, mapping to each one language independent target phoneme symbol a language independent substitute phoneme symbol assignable to a language dependent substitute phoneme symbol of the first language, substituting the language dependent phoneme symbols of the second language by the language dependent substitute phoneme symbols of the first language.

12 Claims, 7 Drawing Sheets

(56) References Cited

U.S. PATENT DOCUMENTS

| | | | |
|---|---|---|---|
| 2005/0144003 A1 | 6/2005 | Iso-Sipila | |
| 2005/0182630 A1* | 8/2005 | Miro et al. | 704/269 |
| 2009/0055162 A1* | 2/2009 | Qian et al. | 704/8 |
| 2009/0313023 A1* | 12/2009 | Jones | 704/260 |
| 2012/0029906 A1* | 2/2012 | Georgiev et al. | 704/8 |
| 2012/0173241 A1* | 7/2012 | Li et al. | 704/260 |

OTHER PUBLICATIONS

J.C. Marcadet et al, "A Transformation-Based Learning Approach to Language Identification for Mixed-Lingual Text-to-Speech Synthesis", INTERSPEECH-2005, Lisborn, Portugal, Sep. 8, 2005, pp. 2249-2252.

Polyâkova et al, "Introducing Nativization to Spanish TTS Systems", Science Direct, Speech Communication, Elsevier Science Publishers, Amsterdam, vol. 53, No. 8, May 24, 2011, pp. 1026-1041.

* cited by examiner

Raw input text:
"Select song: 'La vie en rose'."

Input text with language tags:
"Select song: <lang id='fr'> 'La vie en rose' </lang>."

"Select song: 'La vie en rose'."

"Select song: <lang id='fr'> 'La vie en rose' </lang>."

Language transition probabilities

|         | German | English | French |
|---------|--------|---------|--------|
| German  | .8     | .15     | .05    |
| English | .5     | .5      | 0      |
| French  | .5     | 0       | .5     | p
b, B
p\
t, t`
d, d`, 4, r`, l\, D
c, k, q
g, J\, G\, G
?, >\
m, F
n, n`
J
N, N\
B\
r
R\
f
v
T
s, s`, s\
z, z`, z\
S
Z
C, x, x\
j\
R, X, <\

|   | p | b | B | p\ | t | t` | ... |
|---|---|---|---|----|---|----|-----|
| p |   | 100 | 100 | 100 | 100 | 100 |   |
| b |   |   | 10 | 100 | 100 | 100 |   |
| B |   |   |   | 100 | 100 | 100 |   |
| p\ |   |   |   |   | 100 | 100 |   |
| t |   |   |   |   |   | 10 |   |
| t` |   |   |   |   |   |   |   |
| ... |   |   |   |   |   |   |   |

*Fig. 10*

TEXT TO SPEECH SYNTHESIS FOR TEXTS WITH FOREIGN LANGUAGE INCLUSIONS

This application claims priority from European Patent Application 11189474.7, filed Nov. 17, 2011, which is incorporated herein by reference.

TECHNICAL FIELD

The present invention relates to Text-to-Speech (TTS) technology for creating spoken messages starting from an input text containing at least one word in a first language and at least one word in at least one further language.

BACKGROUND ART

The general framework of a modern commercial TTS system is shown in FIG. 1. An input text—for example "Hello World"—is transformed into a linguistic description using linguistic resources in the form of lexica, rules and n-grams. The text normalization step converts special characters, numbers, abbreviations, etc. into full words. For example, the text "123" is converted into "hundred and twenty three", or "one two three", depending on the application. Next, linguistic analysis is performed to convert the orthographic form of the words into a phoneme sequence. For example, "hello" is converted to "h@-1oU", using a phonetic alphabet. Further linguistic rules enable the TTS program to assign intonation markers and rhythmic structure to the sequence of words or phonemes in a sentence. The end product of the linguistic analysis is a linguistic description of the text to be spoken. The linguistic description is the input to the speech generation module of a TTS system.

State of the art TTS systems use one of two methods to generate a speech signal. The unit selection method is based on the selection of speech segments (or "units") from a large database of speech segments. The segments typically stem from a single speaker or voice talent. The speaker typically records several hundred sentences, corresponding to several hours of speech. The HMM-based speech synthesis method is based on generating speech parameters using a statistical model. The statistical model is trained on a database of recorded speech. The speech can stem from multiple speakers. Speaker adaptation techniques are converting the voice identity of speech generated by a statistical model.

EP 1 835 488 B1 discloses a method for converting an input linguistic description into a speech waveform comprising the steps of deriving at least one target unit sequence corresponding to the linguistic description, selecting from a waveform unit database a plurality of alternative unit sequences approximating the at least one target unit sequence, concatenating the alternative unit sequences to alternative speech waveforms and choosing one of the alternative speech waveforms by an operating person. Finding the best speech waveform depends on a operating person.

There is an increasing demand for TTS systems that can render texts with foreign language inclusions. For example, in German texts English terminology is commonly used, or reference is made to songs or movie titles in a language like French or Italian. In the navigation domain, drivers crossing a language border expect their navigation system to pronounce foreign location names. The pronunciation should be intelligible and match the driver's proficiency in the foreign language, while using the voice the driver has selected.

State of the art TTS systems are typically designed for mono-lingual text input. Several TTS systems support multiple languages, but during operation only one language is activated at a time. Foreign language inclusions are often pronounced using letter-to-sound rules that are valid for the activated language but are inappropriate for the foreign language. For example, the French location name "Bois de Boulogne" may be pronounced by a mono-lingual English TTS as "Boys day Bow-log-gen"

A known approach to support mixed lingual input is to include a list of foreign words in the pronunciation lexicon of a mono-lingual TTS. The foreign words are transcribed using the phoneme set of the native language. Then, "Bois de Boulogne" may be pronounced as "Bwa duh Boo-lon-je". This approach still has several disadvantages. The added word list requires memory space, which is costly for embedded systems. The list has to be derived for each combination of a foreign and native language, where the foreign language determines which words need to be added, and the native language determines the phoneme set to be used for the transcription. Finally, the foreign word list is finite, leaving words or names in the foreign language without a proper transcription.

Another shortcoming of state of the art TTS systems is that the output speech signal does not contain phonemes that occur in a foreign language but not in the native language. For example the German vowel "ü" or the Spanish "rr" cannot be produced by an English TTS system. Human speakers, on the other hand, often become quite proficient at pronouncing foreign phonemes, even if they did not learn to pronounce these sounds during childhood. For example, many German speakers have no problem pronouncing the rhoticised English "r" in "great" or "road". Human listeners with a proficient foreign language skill find a TTS system that does not mimic their phonetic proficiency level simplistic or primitive.

In US 2007/0118377 A1 (Badino et al), in CAMPBELL Nick: "Talking Foreign Concatenative Speech Synthesis and the Language Barrier" EUROSPEECH 2001, vol. 1, 2001, page 337, XP007005007 AALBORG, DK and in CAMPBELL Nick: "Foreign-Language Speech Synthesis" PROCEEDINGS OF ESCA/COCOSDA WORKSHOP ON SPEECH SYNTHESIS, 26 Nov. 1998-29 Nov. 1998 pages 177-180, XP002285739 JENOLA CAVES HOUSE, Australia, phoneme mapping mechanisms are described. The phoneme mapping in Badino and in Campbell is based on phonetic feature vectors, where the vector components are acoustic characteristics. For each phoneme in each language a set of phonetic articulatory features is defined, such as voicedness, place of articulation, and manner of articulation (vowel, consonant, diphthong, unstressed/stressed, long, nasalized, rounded, front, central, back, plosive, nasal, trill, tapflap, fricative, lateral, affricate, bilabial, labiodentals, dental, alveolar, palatal, uvular, glottal, aspirated, semiconsonant . . . ). A distance measure is defined as a weighted combination of feature differences. The disadvantages of this approach are that the weights are difficult to tune and it is often found that the phoneme mapping with the lowest distance is not perceptually optimal. The approach also requires the distance calculations to be repeated for each speech unit.

According to Badino the comparison between phonemes is carried out for each phoneme pair by comparing the corresponding vectors, allotting respective scores to the vector-to-vector comparisons. Using vectors of 8 IPA standard components causes a time consuming comparison.

Campbell discloses in "Talking Foreign" the use of mapping vectors based not on direct phone-to-phone pairs, but on vectors of articulatory features. In "Foreign-Language Speech Synthesis" it is disclosed that the waveform data (or its cepstral transform) is taken as a model to specify the acoustic characteristics of the desired speech. The acoustic similarity is compared by scoring every candidate phone.

Acoustic characteristics (vectors) have to be known for all phonemes to be compared. The provided pronunciations of the foreign words sound simplistic to listeners with a more proficient knowledge of the foreign language. The known method is reduced to express only a limited number of known words of a foreign language with waveform data of the native language.

Romsdorfer et al, Text Analysis and Language Identification for Polyglot Text-to-Speech Synthesis, Speech Communication, Vol 49/9, pp. 697-724, September 2007, describe a method to predict an accurate foreign transcription for words of a foreign language. The method is based on a modular approach that integrates foreign language morphology and syntax components in a joint framework. The method produces a linguistic description that can be sent to a speech generation module. However the approach does not teach a method to synthesize foreign phonemes that are not in the phoneme set of the database speaker. It is necessary to map foreign phonemes to phonemes spoken by the database speaker. Romsdorfer et al have used multi-lingual speakers to cover the phonemes of the languages in their mixed-lingual system. It is clear that this approach does not generalize well, as one requires voice talents for each native language to be proficient at each foreign language that is to be supported by the TTS system.

To overcome the phoneme set limitation of a given TTS voice, a known solution is to switch voices for foreign language text inclusions. This solution introduces an undesirable break between parts of the sentence in the native language and parts of the sentence in a foreign language. Often a long pause is introduced and the intonation flow is interrupted. Moreover the voice identity changes, which is unnatural for example in the navigation domain ("Turn right onto the Bahnhofstrasse") or for entertainment announcements ("You are listening to <<Les Champs Elysées>> by Joe Dassin").

There have been some proposals in the literature to enrich voice databases with foreign sounds. For example, Conkie and Syrdal, "Expanding Phonetic Coverage in Unit Selection Synthesis through Unit Substitution from a Donor Voice", Proceedings Interspeech, 2006, excise a "th" sound from an English voice database and add it to a South American Spanish database. Unfortunately this approach only produces satisfactory results for unvoiced sounds. For voiced and especially sonorant sounds, the speaker identity of the donated units interferes with the identity of the native voice. Donated sonorant units also can introduce large concatenation errors because their phonetic quality does not match that of the native units.

Latorre et al., "New approach to the polyglot speech generation by means of an HMM-based speaker adaptable synthesizer", Speech Communication, vol. 48, no. 10, pp. 1227-1242, October 2006, describe an approach where the acoustic models of an HMM synthesizer are trained from recordings of multiple speakers speaking multiple languages. The acoustic models are then matched to a target speaker using statistical speaker adaptation. However, the quality of HMM-based speech synthesis is lower than the quality of unit selection-based synthesis. This is due to the fact that the statistical modeling approach cannot preserve detailed information necessary for high fidelity speech.

SUMMARY

Embodiments of the present invention are directed a method, a computer program product and a processor for converting an input text with words containing at least one word in a first language and at least one word in at least one further language into a speech waveform. A phoneme symbol resource of the first language is provided. Then a sequence of language dependent phoneme symbols is generated including: identifying at least one specific further language for words which do not belong to the first language, adding at least one phoneme symbol resource of the at least one specific further language, applying the phoneme symbol resource of the first language for words in the first language, and applying the at least one phoneme symbol resource of the at least one specific further language for words in the at least one specific further language. Language dependent phoneme symbols generated for the at least one word of the at least one further language are replaced with language dependent phoneme symbols of the first language, including: assigning to each language dependent phoneme symbol of the at least one specific further language a language independent target phoneme symbol, mapping to each language independent target phoneme symbol a language independent substitute phoneme symbol assignable to a language dependent substitute phoneme symbol of the first language, and substituting the language dependent phoneme symbols of the at least one specific further language by the language dependent substitute phoneme symbols of the first language which are assignable to the language independent substitute phoneme symbols. At least one target unit sequence is derived which corresponds to a sequence of phoneme symbols including language dependent phoneme symbols of the first language. A waveform unit sequence approximating the at least one target unit sequence is selected from a waveform unit database of the first language and concatenated to the speech waveform.

The speech output is characterized by a consistent, unique speaker identity. Words in the first language are pronounced with a correct pronunciation and words in the foreign (further) language are pronounced with a proficient foreign pronunciation. The disclosed arrangement is designated as a polyglot text-to-speech system.

The at least one word in at least one further language can be marked in the input text, wherein the input text is enriched with language tags. The language tags can be added to the input text by a detection algorithm that splits and assigns the input text into text parts belonging to the first language and text parts belonging to the at least one further (foreign) language. Splitting and assigning includes at least one of the steps of identifying a change of character sets in the input text, using the probability of character n-grams, applying predetermined language transition probabilities and taking into account punctuations for example quotes.

Word sequences tagged to be of a foreign language are handled by a language dependent text analysis module. In addition to or instead of a phoneme symbol resource of the first language, a phoneme symbol resource of a specific further language can be added and applied. The language dependent text analysis module (phoneme symbol resource) performs steps such as text normalization, phonetic transcription, part-of-speech prediction and prosodic prediction. The language dependent text analysis module returns a linguistic description of the foreign input text. The modular application of text analysis, respectively phoneme symbol resources, allows the use of regular resources. There is no need for resources adapted to inclusions in other languages.

The language dependent text analysis modules can be connected in parallel or in series. In series—within a sentence of the input text—the first language can be analyzed after the inclusions in a foreign language, where the already analyzed parts can be considered when analyzing the text parts in the first language. In a specific embodiment there is only one phoneme symbol resource active at the same time.

In a specific embodiment, the language independent target phoneme symbols belong to a set of X-SAMPA phonetic transcriptions including 78 transcriptions for consonants and 29 transcriptions for vowels. For the step of mapping predefined distances between pairs of X-SAMP consonants and between pairs of X-SAMP vowels can be used to find a language independent substitute phoneme symbol with the shortest distance to the language independent target phoneme symbol.

BRIEF DESCRIPTION OF THE DRAWINGS

FIG. 9 is a list of X-SAMPA consonants and vowel symbols partitioned into sets with low distances between the elements of a set.

FIG. 10 is a table with phonetic distances based on the sets in FIG. 9.

DETAILED DESCRIPTION

Various embodiments of the present invention are directed to techniques to generate a speech output from a text input written in a first language and containing inclusions in a second language. The first language is called the native language and the second language is called the foreign language. The speech output generated by the disclosed method is characterized by a consistent, unique speaker identity.

Words in the native language are pronounced with a native pronunciation and words in the foreign language are pronounced with a proficient foreign pronunciation. The proficient foreign pronunciation is modeled after the pronunciation of a human speaker with knowledge and skill at speaking the foreign language, using the technical means disclosed in the following. The disclosed method is designated as a polyglot text-to-speech system.

Language Tagging

Figure 1:
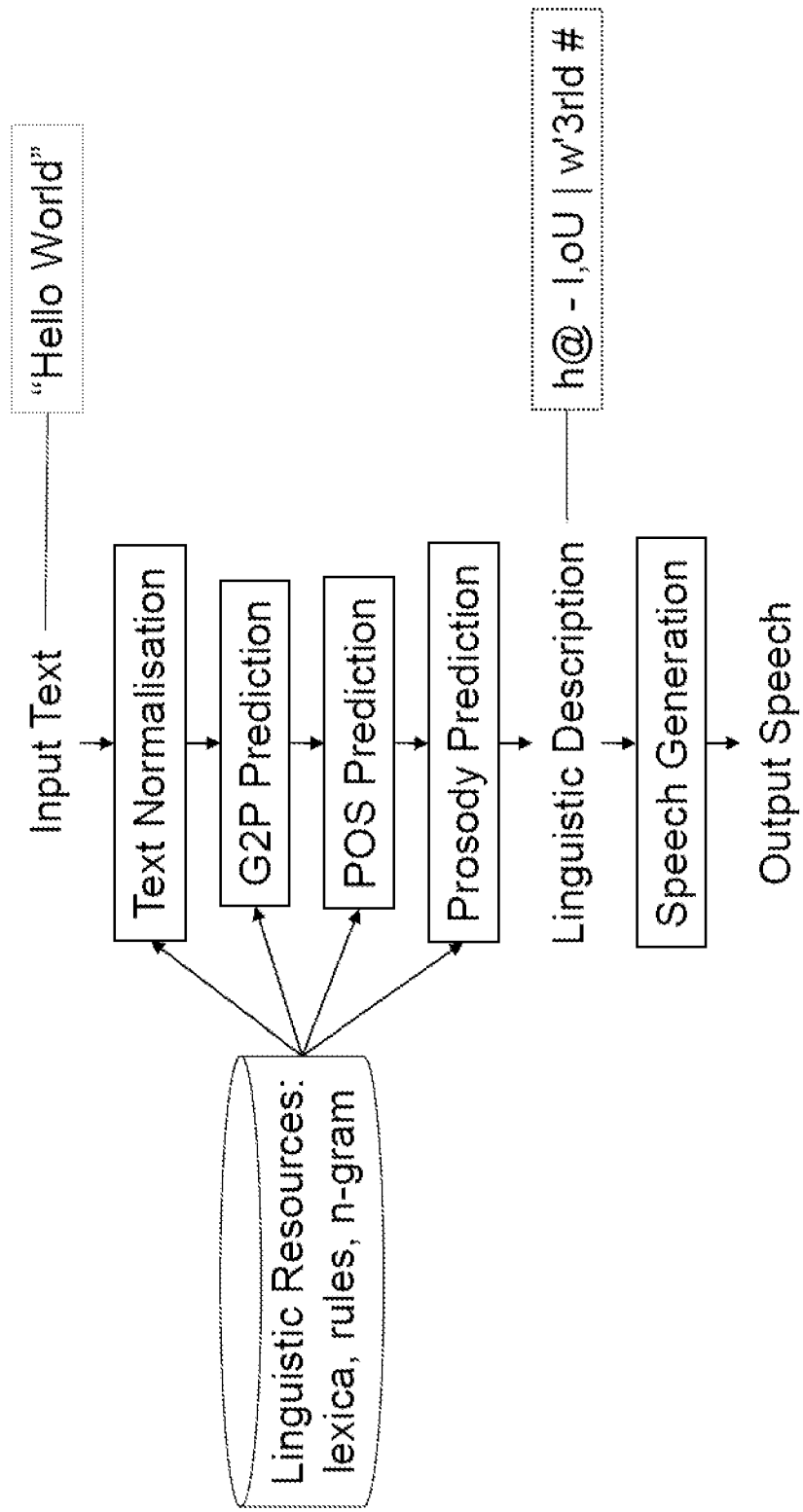
FIG. 1 is a block-diagram view of a general unit selection framework (state of the art).
Figures 2, 3, 4:
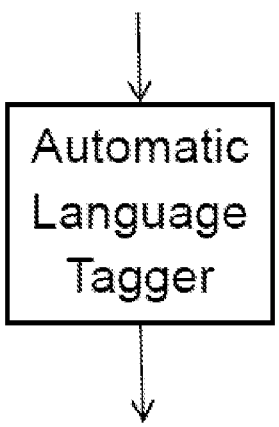
FIG. 2 shows a raw input text and an input text with language tags.
FIG. 3 shows an automatic language tagger with a raw input text and an enriched text with language tags.
FIG. 4 is a table with language transition probabilities.

The input text is enriched with language tags. The language tags indicate which parts of the input text are in the first (native) language and which parts are in the second (foreign) language. The language tags are illustrated in FIG. 2.

Knowledge of the input domain can be used to provide the language tags. In a music player the song titles are often in a different language. This information can be stored in a database together with the song information. In the navigation domain the location names are often in a different language. The location names can be stored in a database listing the country or language area in which the place name is located, and this information can be provided to the text-to-speech system.

In a specific embodiment, the language tags are provided by a language detection algorithm. The language detection algorithm splits the input text into text parts belonging to the native language and text parts belonging to a foreign language. The automatic language tagging step is illustrated in FIG. 3. One or more foreign languages can be detected and tagged.

Automatic language detection is quite easily performed when a language switch is marked by a change in character sets or encodings. Examples of separate character sets are Latin, Greek, Cyrillic, and Mandarin character sets. If the native language is Mandarin and a sequence of Latin characters is found in a Mandarin text, often the inclusion of an English word or phrase can be assumed.

More generally, the language detection module in the disclosed method uses the probability of character n-grams as the language indicator. In one embodiment, the probability of the language transitions is also taken into account. For example, if the native language of a text is German and the text-to-speech system is configured to correctly pronounce English and French inclusions, language transition probabilities can be provided as illustrated in FIG. 4. In the example of FIG. 4 the most likely language transition is German-German, i.e. between most words there is no language switch. The transition from an English inclusion directly into a French inclusion is considered the most unlikely. The transition probability labels can be adapted to the specific application.

A further refinement is to take punctuation into account in the language transition probabilities. The presence of quotes ("or' or «») or a colon (:) signals a higher probability for a transition from the native language to a foreign language. A transition probability matrix similar to FIG. 4 can therefore be defined for each class of punctuation symbols. The optimal language detection result maximizes both the n-gram probabilities and the transition probabilities. This is achieved efficiently using a dynamic programming algorithm that is well known to those familiar in the art.

Text Analysis

Figure 5:
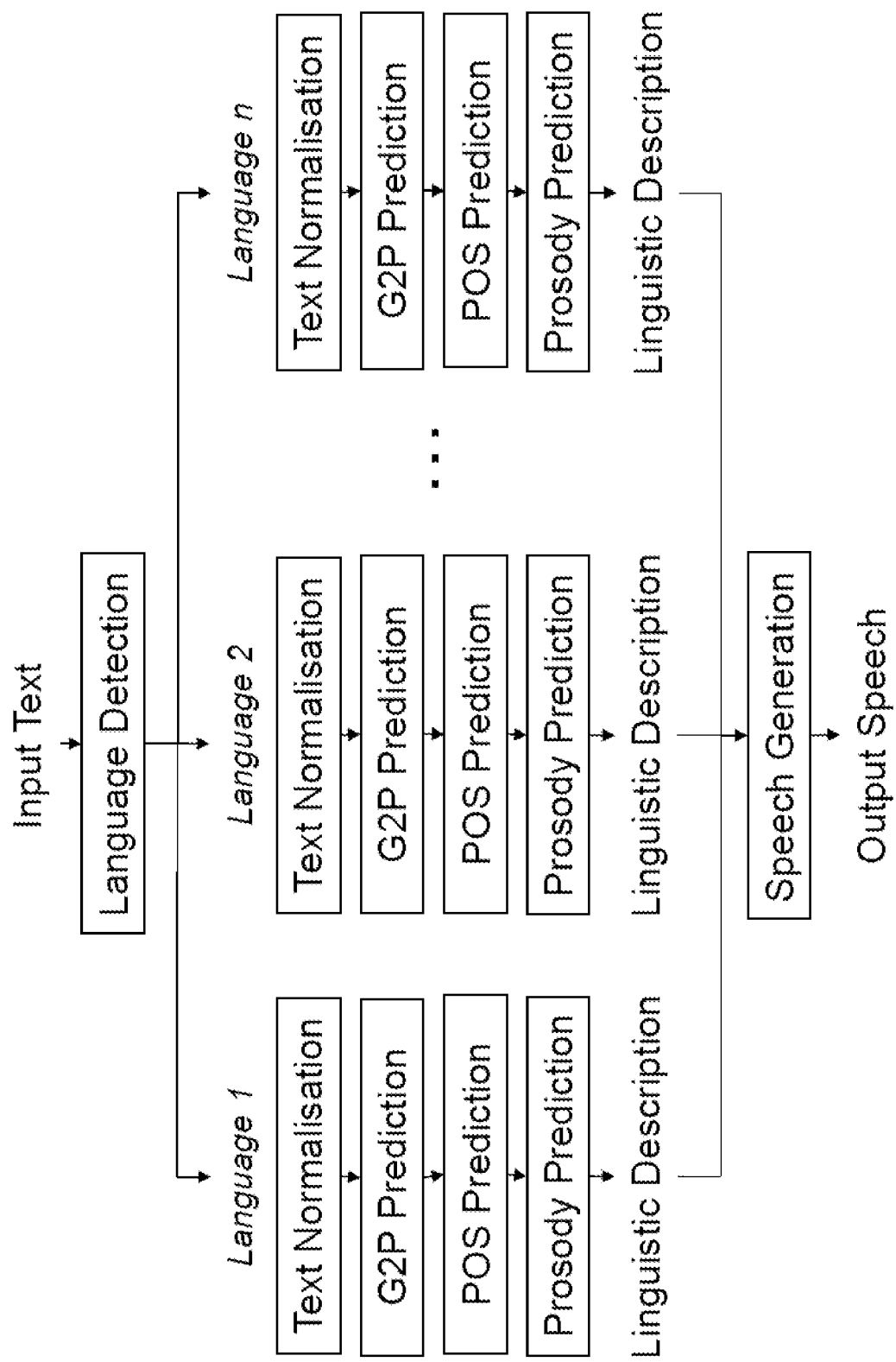
FIG. 5 is a block diagram with language dependent text analysis modules connected in parallel.
Figure 6:
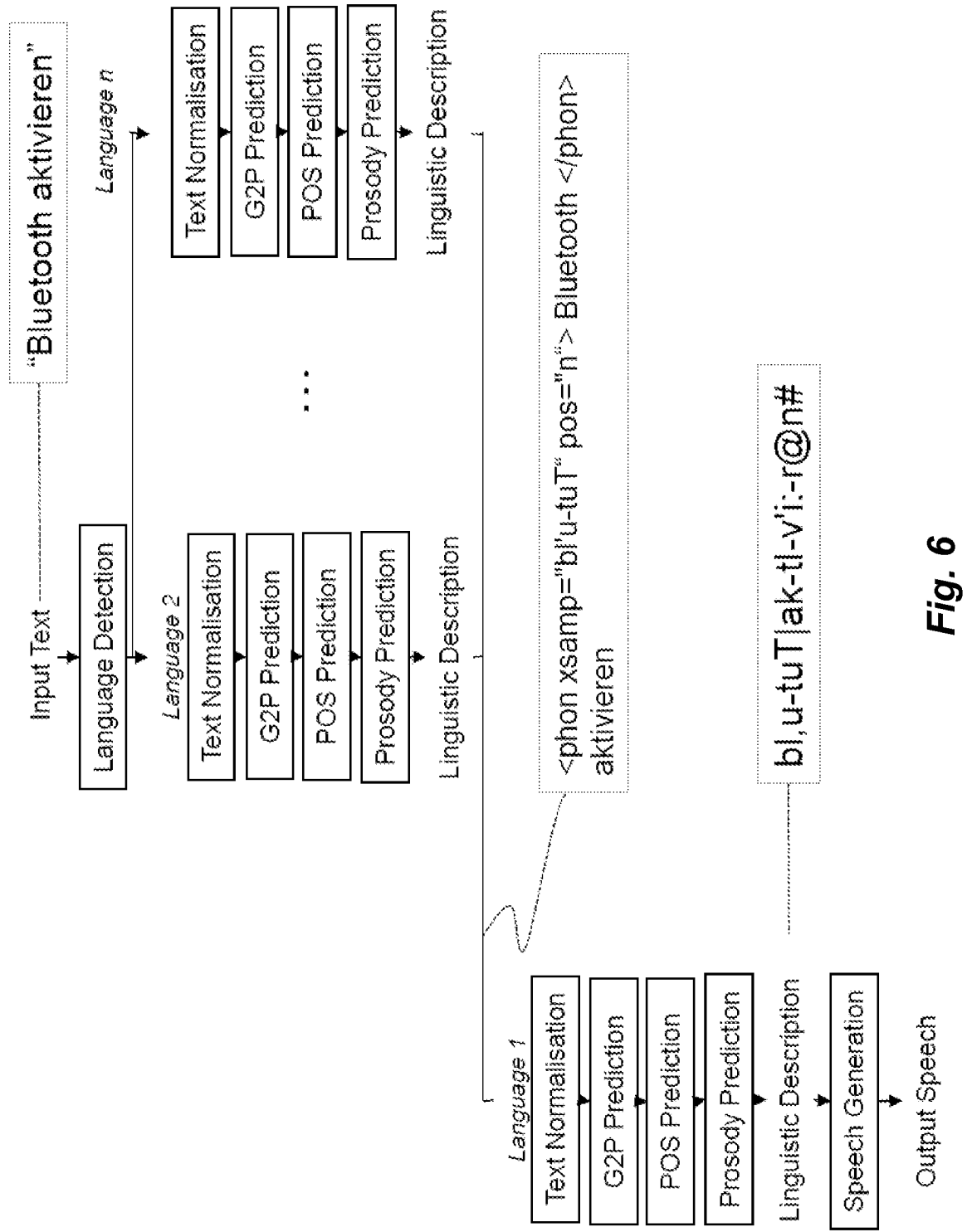
FIG. 6 is a block diagram with language dependent text analysis modules connected in series.

After language tagging, word sequences tagged to be of a foreign language are handled by a language dependent text analysis module. In addition to or in place of a phoneme symbol resource of the first language a phoneme symbol resource of a specific further language is added and applied. The language dependent text analysis module (phoneme symbol resource) performs steps such as text normalization, phonetic transcription, part-of-speech prediction and prosodic prediction, as illustrated in FIG. 5. The language dependent text analysis module returns a linguistic description of the foreign input text. The language dependent text analysis modules can be connect in parallel (FIG. 5) or in series (FIG. 6). In series the native (respectively first) language is preferably analyzed after the inclusions in foreign language, where the already analyzed parts can be considered when analyzing the text parts in the first language.

The language dependent text analysis modules shown in FIGS. 5 and 6 are monolingual and independent from other language dependent text analysis modules. The modules can thus be designed once for each language without regard to their use as a native text analysis module or as a foreign text analysis module. The design and maintenance of text analysis modules handling texts with foreign language inclusions is thus greatly simplified.

Figure 7:
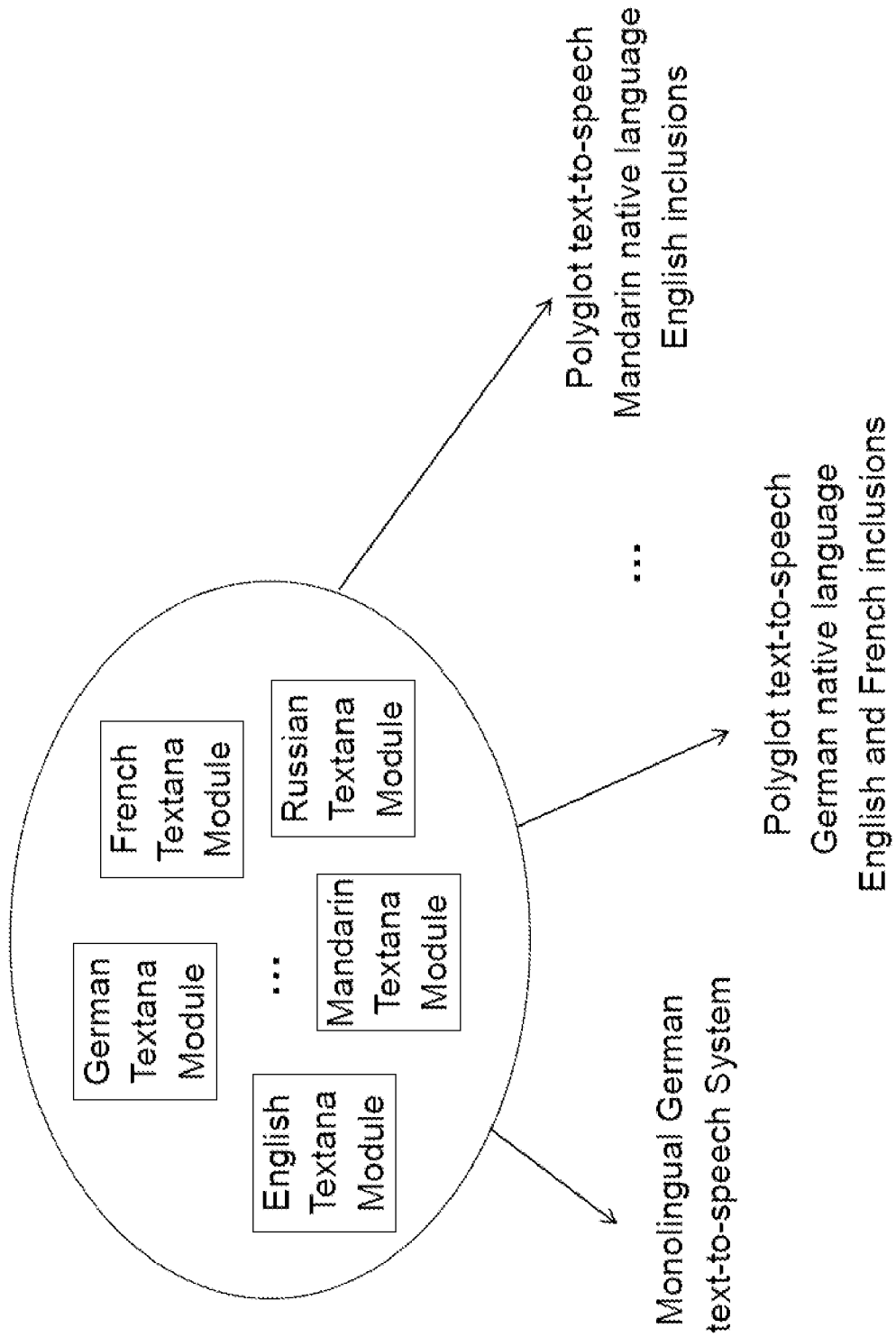
FIGS. 7 and 8 are a collection of language dependent text analysis modules (phoneme symbol resources) that can be configured as needed to create a monolingual text-to-speech system or a polyglot system supporting inclusions in one or more foreign languages.

FIG. 7 illustrates the collection of language dependent text analysis modules that can be configured as needed to create a monolingual text-to-speech system or a polyglot system supporting inclusions in one or more foreign languages by adding and applying specific phoneme symbol resources.

In one embodiment, language detection and language dependent text analysis are combined in a single step. For each word in the input text each of a set of predetermined languages is hypothesized and the corresponding language dependent text analysis is run on the word. The language dependent text analysis produces a probability in addition to the linguistic description. The probability reflects how likely the linguistic description is given the hypothesized language and the orthographic form of the word. The language for which the linguistic description is generated with the highest probability is the detected language, and the corresponding linguistic description is used.

Figure 8:
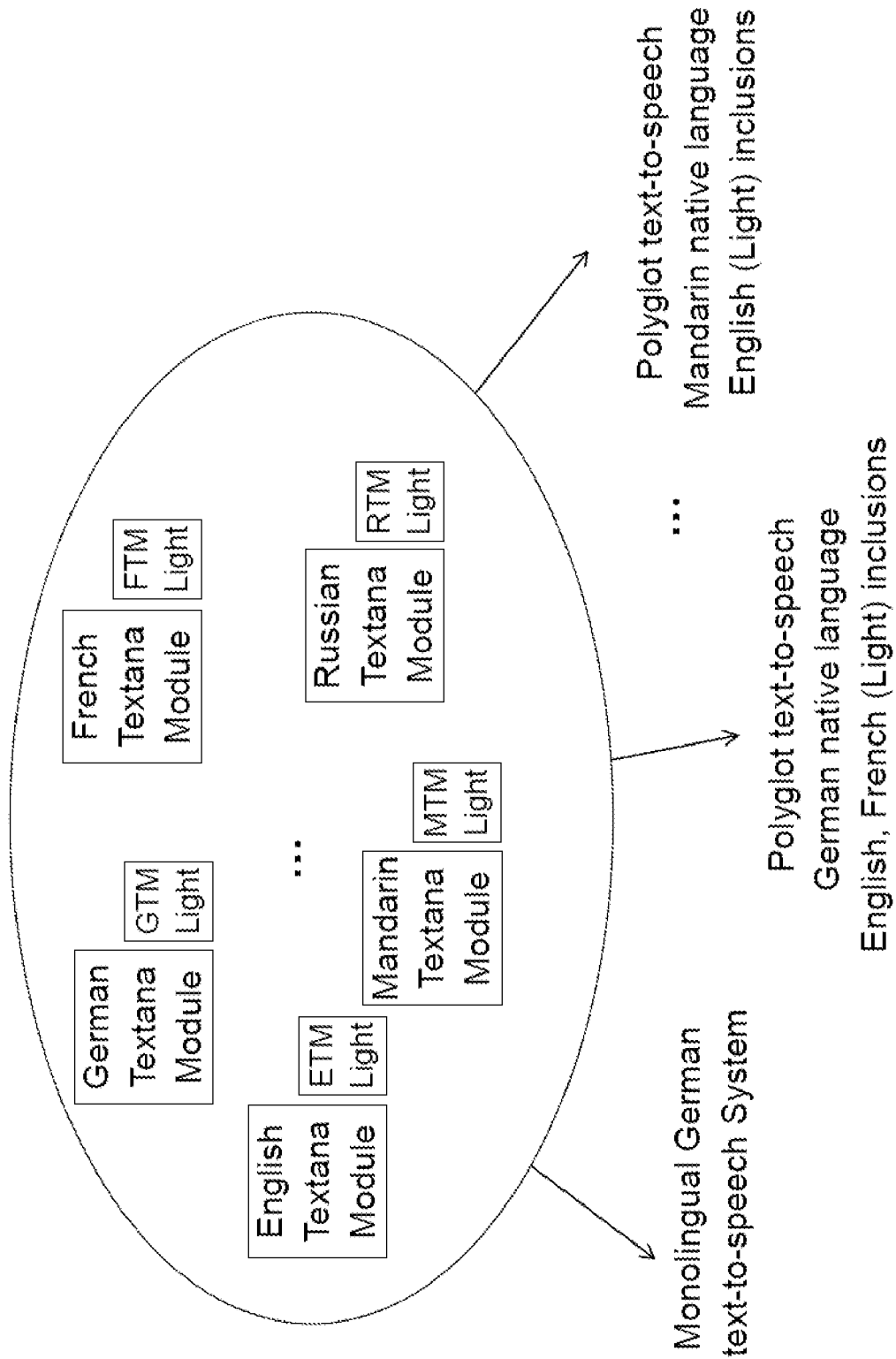

In an embodiment as shown FIG. 8, light weight text analysis modules are available for some languages. The light weight text analysis modules consume less memory or processing power, possibly at the cost of lower accuracy. The light weight text analysis modules are preferred when a polyglot system needs to support a large number of foreign languages or when resource consumption on the target device or platform is critical.

A specific embodiment of the process in FIG. 5 or 6 utilizes a software architecture designed to perform text analysis in one language. The software architecture reads from a data file the language specific information required for text analysis (phoneme symbol resource). Such language specific information includes lexica, rule sets, and n-gram probabilities. At the transition marked by a language tag (see FIG. 2 or 3), the loaded language specific data (phoneme symbol resource) are discarded. Language specific data (phoneme symbol resource) corresponding to the new language are loaded. Then the system operates on the text input using the new language data, thus treating the foreign language inclusion according to the text analysis data of the new language. Part-of-speech predictions of the foreign word sequence such as "noun phrase" or "first person singular verb" can be included in the linguistic description from each language dependent text analysis module, together with the probability of each part-of-speech prediction.

Merging Linguistic Descriptions

In one embodiment, for a given input text with foreign language inclusions the linguistic descriptions from the language dependent text analysis modules are combined by concatenation. This is illustrated in FIG. 5.

In a specific embodiment, the linguistic descriptions generated by a foreign language text analysis module are inserted into the original input text using phoneme markup tags. This is illustrated in FIG. 6. The input text including phoneme markup tags is analyzed using the native text analysis module. In the text normalization step of the native language text analysis module, the tagged foreign inclusion is skipped by the native text normalization rules. In the grapheme to phoneme step, the foreign words are not analyzed by the native grapheme to phoneme module. Rather, the phonetic transcription from the extended phoneme tag is accessed and adapted to the native phoneme set. In the sentence analysis step, the part-of-speech labels and probabilities in the phoneme tag are used during the native part of speech analysis of the complete input text. In the prosodic analysis step, the prosodic markers in the phoneme tag are integrated with the prosodic markers predicted for the native text. The result of the text analysis step respectively the result of the application of the phoneme symbol resource is a linguistic description consisting of prosodic markers and phoneme symbols.

Linguistic descriptions are the output of the various language dependent text analysis modules as shown in FIG. 5.

The linguistic descriptions need to be converted to a unified linguistic description that can be processed by the signal generation module of the native language. In the disclosed invention, this conversion is done in two steps. In a first step the linguistic description output by a foreign text analysis module is converted to a language independent phonetic description. The conversion is made by assigning to each language dependent phoneme symbol of the foreign language at least one language independent target phoneme symbol, for example, using the X-SAMPA phonetic alphabet (http://en.wikipedia.org/wiki/X-SAMPA). This conversion is a simple table lookup step.

A second step includes mapping to the at least one language independent target phoneme symbol (for example in the X-SAMPA phonetic transcription) at least one language independent substitute phoneme symbol assignable to a language dependent substitute phoneme symbol of the first (native) language. The use of an intermediate language independent phonetic representation such as X-SAMPA reduces complexity compared to defining phoneme mapping rules for each language pair. Then, mapping rules are specified to map between language independent phonetic representation (for example of X-SAMPA characters) corresponding to different languages. For example, the French round high back vowel {y:}, as in "mix" does not exist in English. The X-SAMPA sequence {y:} must be mapped to one of the X-SAMPA sequences corresponding to a phoneme in the English phoneme set, such as {u:}.

X-SAMPA contains 78 consonant and 29 vowel symbols. In the disclosed method, distances are specified between each pair of X-SAMPA consonants and each pair of X¬ SAMPA vowels. This corresponds to 78*77/2+29*28/2=3409 distances. To map the X¬ SAMPA sequence for a phoneme in language A to an X-SAMPA sequence corresponding to the best matching phoneme in language B, the X-SAMPA sequence corresponding to a phoneme in language B is chosen that has the lowest distance to the X-SAMPA sequence in language A.

The 3409 distances can be defined by hand by a phonetic expert. An advantageous method to define the distances is to partition the symbols into sets. This is illustrated in FIG. 9, where symbols on the same line separated by commas belong to the same set. A low distance such as 10 is defined between different symbols in the same set. A high distance such as 100 is defined between symbols that are not in the same set. The approach with low and high distances is advantageous in combination with the features disclosed in the next section, where phonemes from language A for which there is no phoneme in language B in the same set are donated to language B and thus become available in the phoneme inventory of language B. FIG. 10 shows the phonetic distances based on the sets in FIG. 9. Only distances above the diagonal are shown as the matrix is symmetrical and the distance of a symbol onto itself is 0. Special care needs to be taken with diacritics and X-SAMPA sequences containing more than one consonant or vowel symbol. Diacritics indicate features such as nasalization, lengthening, or aspiration. A simple approach is to ignore diacritics for the purpose of mapping between a language A and B, and only consider diacritics to resolve possible ties in the mapping. One approach is to allow diacritics to be mapped to other diacritics or consonant or vowel symbols. For example the nasalization diacritic might be mapped to a nasal consonant.

If an X-SAMPA sequence contains more than one consonant or vowel symbol, a simplistic approach is to add up the distances for the multiple symbols. For example if the X-SAMPA sequence for a phoneme in language A contains 2 consonant or vowel symbols x and y, and the sequence for a phoneme in language B contains 1 symbol z, the distances d(x,z) and d(y,z) are added. In general, if the sequence in language A contains n symbols and the sequence in language B contains m symbols, the symbols are first aligned, e.g. linearly, and the distances are accumulated. One approach allows the multiple symbols in the sequence in language A to be split up over several phonemes in language B. For example, the diphthong {al"} may be split into {a} and {12}. That way, the diphthong can be mapped to a sequence of two vowels in language B.

After low level prosody prediction for the foreign inclusions, the speaking rate, F0 average and F0 range are adapted to those of the native voice.

Acoustic Polyglot Extensions

In one embodiment, the set of phonemes that can be rendered acoustically by the native voice is extended with foreign phonetic units. The foreign phoneme units may be recorded by the native speaker that created the native unit database. In one embodiment, the foreign phonetic units are donated from a unit database of a foreign speaker and are modified in a voice conversion step.

The selection of donated phoneme units is based on an automatic criterion. Each phoneme in language A for which the X-SAMPA distance to the nearest phoneme in language B exceeds a threshold becomes a donated phoneme. For example, the French {y:} is donated to the English native voice if the distance to the nearest English phoneme {u:} exceeds the threshold.

The voice conversion step matches the spectral characteristics of the foreign speaker to those of the native speaker. In one embodiment broad spectral characteristics can be transformed, such as the average energy in different frequency bands. In one embodiment, the phoneme units of the foreign speaker and those of the native speaker are clustered, and the clusters are paired between the two speakers. An optimal spectral adaptation involving a frequency warping step and an amplitude correction step is designed per cluster pair. The weighted adaptation is performed on the phoneme units of the foreign speaker, where the frequency warping and the amplitude correction performed on each phoneme unit is a weighted sum of warping and correction functions and the weight depends on the probability that a phoneme unit belongs to the cluster pair corresponding to the functions.

It will be clear to those familiar in the art that the phoneme units for which voice morphing or phonetic morphing is performed can be phones, diphones, triphones, variable size units, or subphone units, such as half phones or units corresponding to an HMM state. The units can be morphed and added in an offline process. In one embodiment, the system retrieves foreign acoustic units from the foreign or native speaker unit database during synthesis and performs morphing online. This is advantageous to reduce the storage cost for the foreign phoneme units.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer-implemented method employing at least one hardware implemented computer processor for converting an input text with words containing at least one word in a first language and at least one word in at least one further language into a speech waveform comprising the steps of:

providing a phoneme symbol resource of the first language; generating a sequence of language dependent phoneme symbols including the steps of:

identifying at least one specific further language for words which do not belong to the first language, adding at least one phoneme symbol resource of the at least one specific further language, applying the phoneme symbol resource of the first language for words in the first language, and applying the at least one phoneme symbol resource of the at least one specific further language for words in the at least one specific further language;

replacing language dependent phoneme symbols generated for the at least one word of the at least one further language with language dependent phoneme symbols of the first language, including the steps of:

assigning to each language dependent phoneme symbol of the at least one specific further language a language independent target phoneme symbol, mapping to each language independent target phoneme symbol a language independent substitute phoneme symbol assignable to a language dependent substitute phoneme symbol of the first language, and substituting the language dependent phoneme symbols of the at least one specific further language by the language dependent substitute phoneme symbols of the first language which are assignable to the language independent substitute phoneme symbols;

deriving at least one target unit sequence corresponding to a sequence of phoneme symbols including language dependent phoneme symbols of the first language;

selecting from a waveform unit database of the first language a waveform unit sequence approximating the at least one target unit sequence; and concatenating the waveform unit sequence to the speech waveform.

2. The method according to claim 1, wherein the step of mapping includes the steps of:

searching for the language independent target phoneme symbol in a predefined table of distances between language independent phoneme symbols at least one language independent approximate phoneme symbol with a distance below a given maximum distance, checking whether the at least one language independent approximate phoneme symbol can be assigned to a language dependent phoneme symbol of the first language, and selecting from the at least one assignable language independent approximate phoneme symbol at least one language independent substitute phoneme symbol.

3. The method according to claim 1, wherein the input text is enriched with language tags.

4. The method according to claim 1, wherein language tags are added to the input text by a detection algorithm that splits and assigns the input text into text parts belonging to the first language and text parts belonging to the at least one further foreign language.

5. The method according to claim 4, wherein the steps of splitting and assigning include at least one of the steps of:

identifying a change of character sets in the input text, using the probability of character n-grams, applying predetermined language transition probabilities, and taking into account punctuations.

6. The method according to claim 1, wherein the steps of applying the phoneme symbol resource of the first language for words in the first language and applying the at least one phoneme symbol resource of the at least one specific further language for words in the at least one specific further language are applied in series.

7. The method according to claim 6, wherein within a sentence of the input text the step of applying the phoneme symbol resource of the first language is made after the step of applying the at least one phoneme symbol resource of the at least one specific further language for words in the at least one specific further language.

8. The method according to claim 6, wherein at the same time only one phoneme symbol resource is active.

9. The method according to claim 1, wherein the language independent target phoneme symbols belong to a set of X-SAMPA phonetic transcriptions.

10. The method according to claim 9, wherein for the step of mapping to a language independent target phoneme symbol a language independent substitute phoneme symbol assignable to a language dependent substitute phoneme symbol of the first language predefined distances between pairs of X-SAMP consonants and between pairs of X-SAMP vowels are used to find a language independent substitute phoneme symbol with the shortest distance to the language independent target phoneme symbol.

11. A computer program product encoded in a non-transitory computer-readable medium for converting an input text with words containing at least one word in a first language and at least one word in at least one further language into a speech waveform, the product comprising:

program code for providing a phoneme symbol resource of the first language;

program code for generating a sequence of language dependent phoneme symbols including program code for:

identifying at least one specific further language for words which do not belong to the first language, adding at least one phoneme symbol resource of the at least one specific further language, applying the phoneme symbol resource of the first language for words in the first language, and applying the at least one phoneme symbol resource of the at least one specific further language for words in the at least one specific further language;

program code for replacing language dependent phoneme symbols generated for the at least one word of the at least one further language with language dependent phoneme symbols of the first language, including program code for:

assigning to each language dependent phoneme symbol of the at least one specific further language a language independent target phoneme symbol, mapping to each language independent target phoneme symbol a language independent substitute phoneme symbol assignable to a language dependent substitute phoneme symbol of the first language, and substituting the language dependent phoneme symbols of the at least one specific further language by the language dependent substitute phoneme symbols of the first language which are assignable to the language independent substitute phoneme symbols;

program code for deriving at least one target unit sequence corresponding to a sequence of phoneme symbols including language dependent phoneme symbols of the first language;

program code for selecting from a waveform unit database of the first language a waveform unit sequence approximating the at least one target unit sequence; and program code for concatenating the waveform unit sequence to the speech waveform.

12. A text processor for converting an input text with words containing at least one word in a first language and at least one word in at least one further language into a speech waveform, said processor comprising means for:

providing a phoneme symbol resource of the first language;

generating a sequence of language dependent phoneme symbols including means for:

identifying at least one specific further language for words which do not belong to the first language, adding at least one phoneme symbol resource of the at least one specific further language, applying the phoneme symbol resource of the first language for words in the first language, and applying the at least one phoneme symbol resource of the at least one specific further language for words in the at least one specific further language;

replacing language dependent phoneme symbols generated for the at least one word of the at least one further language with language dependent phoneme symbols of the first language, including means for:

assigning to each language dependent phoneme symbol of the at least one specific further language a language independent target phoneme symbol, mapping to each language independent target phoneme symbol a language independent substitute phoneme symbol assignable to a language dependent substitute phoneme symbol of the first language, and substituting the language dependent phoneme symbols of the at least one specific further language by the language dependent substitute phoneme symbols of the first language which are assignable to the language independent substitute phoneme symbols;

deriving at least one target unit sequence corresponding to a sequence of phoneme symbols including language dependent phoneme symbols of the first language;

selecting from a waveform unit database of the first language a waveform unit sequence approximating the at least one target unit sequence; and concatenating the waveform unit sequence to the speech waveform.

* * * * *